(12) United States Patent
Takizawa et al.

(10) Patent No.: US 7,216,743 B2
(45) Date of Patent: May 15, 2007

(54) BICYCLE DISC BRAKE ROTOR ASSEMBLY

(75) Inventors: Shinichi Takizawa, Izumisano (JP); Takanori Kanehisa, Sakai (JP)

(73) Assignee: Shimano Inc., Osaka (JP)

( * ) Notice: Subject to any disclaimer, the term of this patent is extended or adjusted under 35 U.S.C. 154(b) by 62 days.

(21) Appl. No.: 11/098,568

(22) Filed: Apr. 5, 2005

(65) Prior Publication Data

US 2005/0230199 A1 Oct. 20, 2005

(30) Foreign Application Priority Data

Apr. 20, 2004 (JP) ............... 2004-124395

(51) Int. Cl.
*B60L 5/00* (2006.01)
(52) U.S. Cl. .................... 188/26; 301/110.5
(58) Field of Classification Search ............ 188/18 A, 188/26, 24.11–24.22, 218 XL, 73.2; 301/6.8, 301/105.1, 110.5; 384/544, 545
See application file for complete search history.

(56) References Cited

U.S. PATENT DOCUMENTS 6,095,291 A * 8/2000 Bertetti et al. ............ 188/18 A
6,371,252 B1 4/2002 Kanehisa
6,854,569 B2 * 2/2005 Chen ........................... 188/26
2003/0000779 A1 * 1/2003 Kanehisa ..................... 188/19
2003/0151300 A1 * 8/2003 Goss et al. .............. 301/110.5
2004/0165805 A1 * 8/2004 Kanehisa et al. ........... 384/545

FOREIGN PATENT DOCUMENTS

| EP | 783980 | | 7/1997 |
| EP | 1228955 | | 8/2002 |
| EP | 1288117 | A2 * | 3/2003 |
| FR | 2810382 | | 12/2001 |
| JP | 2003-136903 | | 5/2003 |
| WO | WO2004/088162 | | 10/2004 |

* cited by examiner

*Primary Examiner*—Robert A. Siconolfi
(74) *Attorney, Agent, or Firm*—Global IP Counselors, LLP

(57) ABSTRACT

An easily mountable disc brake rotor assembly that is lightweight is provided. The bicycle disc brake rotor assembly includes a rotor and an adaptor and is mounted to the front hub of a bicycle. A caliper mounted to the bicycle's suspension fork grips the rotor. The rotor is a ring-shaped plate, which has brake surfaces that are gripped by the caliper. The adapter is mounted to the front hub and has a deformation that secures the rotor to the hub. External and internal splines on the adapter prevent the rotor from rotating and transmit a braking force exerted on the rotor to the hub, respectively.

18 Claims, 12 Drawing Sheets

BICYCLE DISC BRAKE ROTOR ASSEMBLY

CROSS-REFERENCE TO RELATED APPLICATIONS

This application claims priority to Japanese Patent Application No. 2004-124395, filed Jul. 21, 2004. The entire disclosure of Japanese Patent Application No. 2004-124395 is hereby incorporated herein by reference.

BACKGROUND OF THE INVENTION

1. Field of the Invention

The present invention relates to a rotor assembly. Specifically, a bicycle disc brake rotor assembly is mounted to a bicycle hub and is gripped by a caliper mounted to the bicycle frame. rush 2. Background Information In recent years, a disc brake apparatus has come into wide use as a bicycle brake. A disc brake apparatus includes a caliper that is mounted to the bicycle frame and has opposed internal pistons, as well as a disc brake rotor assembly. The disc brake rotor assembly is mounted to the hub of the bicycle wheel. The conventional rotor assembly includes a rotor having braking surfaces that are gripped by the caliper. The conventional rotor assembly, such as that shown in Japanese Patent Laid-Open Publication No. 2003-136903, further includes a tightening member that fixes the rotor to the hub.

The rotor of this conventional disc brake rotor assembly includes a rotor having braking surfaces and a mounting boss that non-rotatably engages the rotor. The rotor is non-rotatably mounted to the hub. The tightening member is screwed into the hub inner surface and secures the rotor and the mounting boss to the hub via the application of pressure on the rotor toward the mounting boss.

In the conventional disc brake rotor assembly having the above construction, the disc brake rotor assembly can be disassembled simply by removing the tightening member, thereby providing for easy installation or removal of the disc brake rotor assembly. This allows the rotor to be exchanged simply.

Using the conventional construction described above, it is easy to install or remove the disk brake rotor assembly, for exchanging the rotor, for example, because the rotor and mounting boss can be attached or detached from the hub in one step by mounting or removing the tightening member to or from the hub.

However, because the rotor and mounting hub separate when the tightening member is removed, the rotor, which is manufactured as a relatively thin plate member, can become deformed. Accordingly, forming the rotor and the mounting hub as a single unit has been considered, but because the rotor must be made from a relatively hard and rigid material, it would be difficult to make the entire rotor lightweight.

In view of the above, it will be apparent to those skilled in the art from this disclosure that there exists a need for an improved bicycle disc brake rotor assembly that is lightweight and is not prone to deformation. This invention addresses this need in the art as well as other needs, which will become apparent to those skilled in the art from this disclosure.

SUMMARY OF THE INVENTION

An object of the present invention is to provide a disc brake rotor assembly that is lightweight, easy to mount, easy to detach and not prone to deformation.

The bicycle disc brake rotor assembly of a first aspect of the present invention is mounted to a bicycle hub and is gripped by a caliper mounted to the bicycle frame. The rotor assembly includes a rotor and an adapter. The rotor is ring-shaped and has braking surfaces gripped by the caliper. The adapter is mounted to the outer circumferential surface of the hub and has a securing mechanism, a rotation prevention mechanism and an internal force transmission mechanism. The securing mechanism is for securing the rotor to the adapter. Preferably, the securing mechanism is a simple mechanism such as crimping or welding. The rotation prevention mechanism is for preventing the rotation of the rotor about the adapter. The internal force transmission mechanism is generally located on the internal circumferential surface of the adapter. The internal force transmission mechanism transmits the braking force exerted on the rotor to the outer circumferential surface of the hub. When the caliper grips the rotor, the braking force is transmitted to the hub via the securing mechanism and the force transmission mechanism. When the adapter is removed from the hub, the rotor is still secured to the adapter via the securing mechanism. The rotor is therefore less prone to deformation. Furthermore, the disc brake rotor assembly can be easily attached or removed by simply attaching or detaching the adapter from the hub. The rotor and the adapter can be made of different materials, enabling the adapter to be made lightweight.

The bicycle disc brake rotor assembly of a second aspect of the present invention is the bicycle disc brake rotor assembly according to the first aspect, wherein the force transmission mechanism has a first internal thread that engages with an external thread formed on the outer circumferential surface of the hub. In this case, the adapter can be secured to the hub using the force transmission mechanism having the first internal thread.

The bicycle disc brake rotor assembly of a third aspect of the present invention is the bicycle disc brake rotor assembly according to the second aspect, wherein an annular groove is formed in the external thread and the bicycle disc brake rotor assembly further includes a stopper ring mounted in the annular groove in order to prevent the adapter from becoming loose. In this case, the adapter can be prevented from becoming loose by the stopper ring.

The bicycle disc brake rotor assembly of a fourth aspect of the present invention is the bicycle disc brake rotor assembly according to the first aspect, wherein the force transmission mechanism has splines that are non-rotatably mounted to the outer circumferential surface of the hub. In this case, the adapter can be non-rotatably mounted to the hub using the splines.

The bicycle disc brake rotor assembly of a fifth aspect of the present invention is the bicycle disc brake rotor assembly according to the second or fourth aspects, wherein a second internal thread is formed on the inner circumferential surface of the hub. The rotor assembly further includes a tightening member that engages with the second internal thread to prevent the adapter from becoming loose. In this case, regardless of whether the adapter is connected to the hub via screwing or splines, the adapter can be reliably secured and prevented from becoming loose using the tightening member.

The bicycle disc brake rotor assembly of a sixth aspect of the present invention is the bicycle disc brake rotor assembly according to the fifth aspect, wherein the second internal thread runs in the opposite direction from the first internal thread. In this case, even where the first internal thread rotates in the loosening direction during braking, the second internal thread rotates in the tightening direction, making the adapter less prone to loosening.

The bicycle disc brake rotor assembly of a seventh aspect of the present invention is the bicycle disc brake rotor assembly according to any of the second, third, fifth or sixth aspects, wherein the rotor is secured to the adapter by rivets that travel through the rotor and the adapter. In this case, the rotor and the adapter can be reliably secured together.

The bicycle disc brake rotor assembly of an eighth aspect of the present invention is the bicycle disc brake rotor assembly according to any of the first through sixth aspects, wherein the rotor is secured to the adapter via crimping that deforms the adapter. In this case, the rotor can be secured to the adapter using a simple construction.

The bicycle disc brake rotor assembly of a ninth aspect of the present invention is the bicycle disc brake rotor assembly according to any of the first through sixth aspects, wherein the rotor is secured to the adapter via welding. In this case, the securing mechanism is simple.

The bicycle disc brake rotor assembly of a tenth aspect of the present invention is mounted to a bicycle hub and is gripped by a caliper mounted to the bicycle frame, and includes a rotor and an adapter. The rotor has braking surfaces gripped by the caliper. The adapter is mounted to the hub and has (i) multiple external bosses disposed at equal intervals along the circumferential direction in order to secure the rotor to the adapter, and (ii) an internal force transmission mechanism that transmits the braking force exerted on the rotor to the outer circumferential surface of the hub.

In this disc brake rotor assembly, the rotor is secured to the adapter by multiple bosses aligned in the circumferential direction, and the rotation thereof is prevented by a rotation prevention mechanism. Furthermore, the adapter has on its internal circumferential surface a force transmission mechanism that transmits the braking force to the outer circumferential surface of the hub. Using this disc brake rotor assembly, the adapter is secured to the outer circumferential surface of the hub while the rotor is secured to the adapter. When the rotor is gripped by the caliper, the braking force is transmitted to the hub via the force transmission mechanism, thereby braking the hub. The rotor can be secured to the adapter using a simple securing mechanism such as crimping. Consequently, the rotor and the adapter can be made of different materials, enabling the adapter to be made lightweight. Furthermore, because the adapter and the rotor do not come apart when the adapter is detached from the hub, the rotor is less prone to deformation. In addition, the disc brake rotor assembly can be attached or detached by simply attaching or detaching the adapter.

The bicycle disc brake rotor assembly of an eleventh aspect of the present invention is the bicycle disc brake rotor assembly according to the tenth aspect, wherein a hole is formed at the tip of each boss. The rotor assembly further includes securing members that are fixed to the holes and secure the rotor to the adapter. In this case, the rotor can be reliably secured to the adapter using the securing members.

The bicycle disc brake rotor assembly of a twelfth aspect of the present invention is the bicycle disc brake rotor assembly according to the tenth aspect, wherein the rotor is secured to the adapter via crimping that deforms the tip of each boss. In this case, the rotor can be secured to the adapter using a simple construction by crimping that deforms the tip of each boss.

The bicycle disc brake rotor assembly of a thirteenth aspect of the present invention is the bicycle disc brake rotor assembly according to any of the tenth through twelfth aspects, wherein the force transmission mechanism has a first internal thread that engages with the external thread formed on the outer circumferential surface of the hub. In this case, the adapter can be secured to the hub using a force transmission mechanism having a first internal thread.

The bicycle disc brake rotor assembly of a fourteenth aspect of the present invention is the bicycle disc brake rotor assembly according to the thirteenth aspect, wherein an annular groove is formed in the external thread and the rotor assembly further includes a stopper ring mounted in the annular groove to prevent the adapter from becoming loose. In this case, the adapter can be prevented from becoming loose by the stopper ring.

The bicycle disc brake rotor assembly of a fifteenth aspect of the present invention is the bicycle disc brake rotor assembly according to any of the tenth through twelfth aspects, wherein the force transmission mechanism has splines that are non-rotatably mounted to the outer circumferential surface of the hub. In this case, the adapter can be non-rotatably mounted to the hub using the splines.

The bicycle disc brake rotor assembly of a sixteenth aspect of the present invention is the bicycle disc brake rotor assembly according to the thirteenth or fifteenth aspects, wherein a second internal thread is formed on the inner circumferential surface of the hub. The rotor assembly further includes a tightening member that engages with the second internal thread to prevent the adapter from becoming loose. In this case, the adapter can be reliably secured [to the hub] and prevented from becoming loose via the tightening member when the adapter is linked to the hub via screwing or splines.

The bicycle disc brake rotor assembly of a seventeenth aspect of the present invention is the bicycle disc brake rotor assembly according to the sixteenth aspect, wherein the second internal thread runs in the opposite direction from the first internal thread. In this case, even where the first internal thread rotates in the loosening direction during braking, the second internal thread rotates in the tightening direction, making the adapter less prone to loosening.

According to the present invention, because the rotor is secured to the adapter by a securing mechanism and is prevented from rotating by a rotation prevention mechanism, the rotor can be secured to the adapter using a simple securing mechanism such as crimping or welding. As a result, the rotor and the adapter can be made of different materials such that the adapter can be made lightweight. Furthermore, because the adapter and the rotor do not come apart when the adapter is detached from the hub, the rotor is less prone to deformation. In addition, because the disc brake rotor assembly can be attached to or detached from the hub simply by attaching or detaching the adapter, the disc brake rotor assembly can be attached or detached easily.

In a different aspect of the present invention, because the rotor is secured to the adapter and is prevented from rotating by bosses, the rotor can be secured to the adapter and prevented from rotating using a simple securing mechanism such as crimping. Consequently, the rotor and the adapter can be made of different materials, enabling the adapter to be made lightweight. Furthermore, because the adapter and the rotor do not come apart when the adapter is detached from the hub, the rotor is less prone to deformation. In addition, because the disc brake rotor assembly can be attached to or detached from the hub simply by attaching or detaching the adapter, the disc brake rotor assembly can be attached or detached easily.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
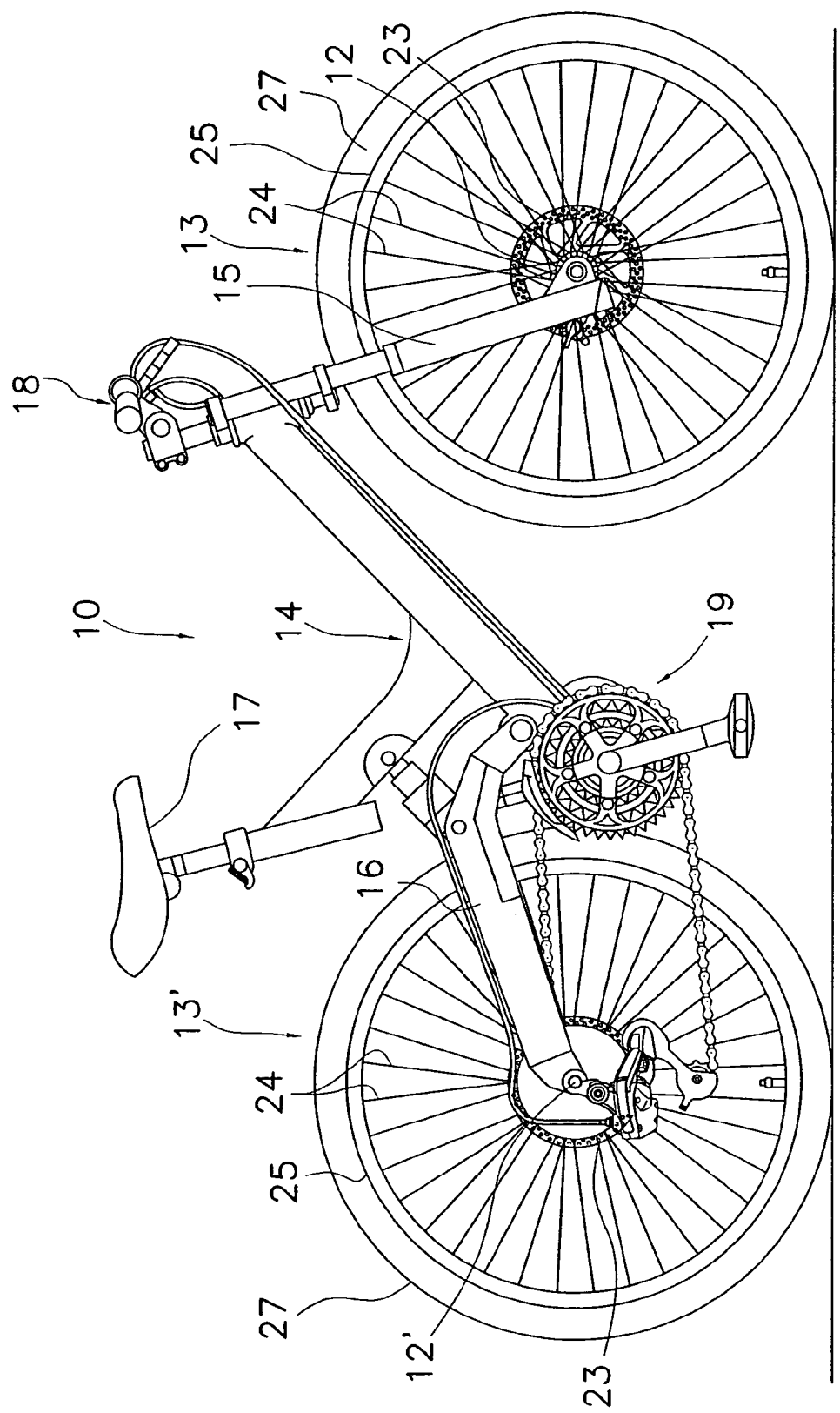
FIG. 1 is a right side elevational view of a bicycle having front and rear hubs with disc brake rotor assemblies in accordance with a first embodiment of the present invention.

Referring initially to FIG. 1, a bicycle 10 is illustrated that includes a frame 14 having a double-crown type suspension fork 15 in the front and a swing arm 16 in the rear. A front hub 12 is mounted to the ends of the suspension fork 15 and a rear hub 12' is mounted to the end of the swing arm 16. The front hub 12 rotatably connects the front wheel 13 to the ends of the suspension fork 15 of the frame 13. The rear disc brake hub 12' rotatably connects the rear wheel 13' to the end of the swing arm 16. The frame 14 further includes a saddle 17 that is adjustably mounted to the frame 14, a handlebar 18 that is linked to the suspension fork 15, and a drive train 19 that propels the bicycle 10.

As shown in FIG. 1, multiple spokes 24 extend outward from the front and rear hubs 12 and 12' of the front and rear wheels 13 and 13', respectively, as shown in FIG. 1. The outer ends of the spokes 24 are connected to rims 25 via spoke nipples (not shown). Tires 27 are mounted to the outer circumferential surfaces of the rims 25 using a conventional method.

Figure 2:
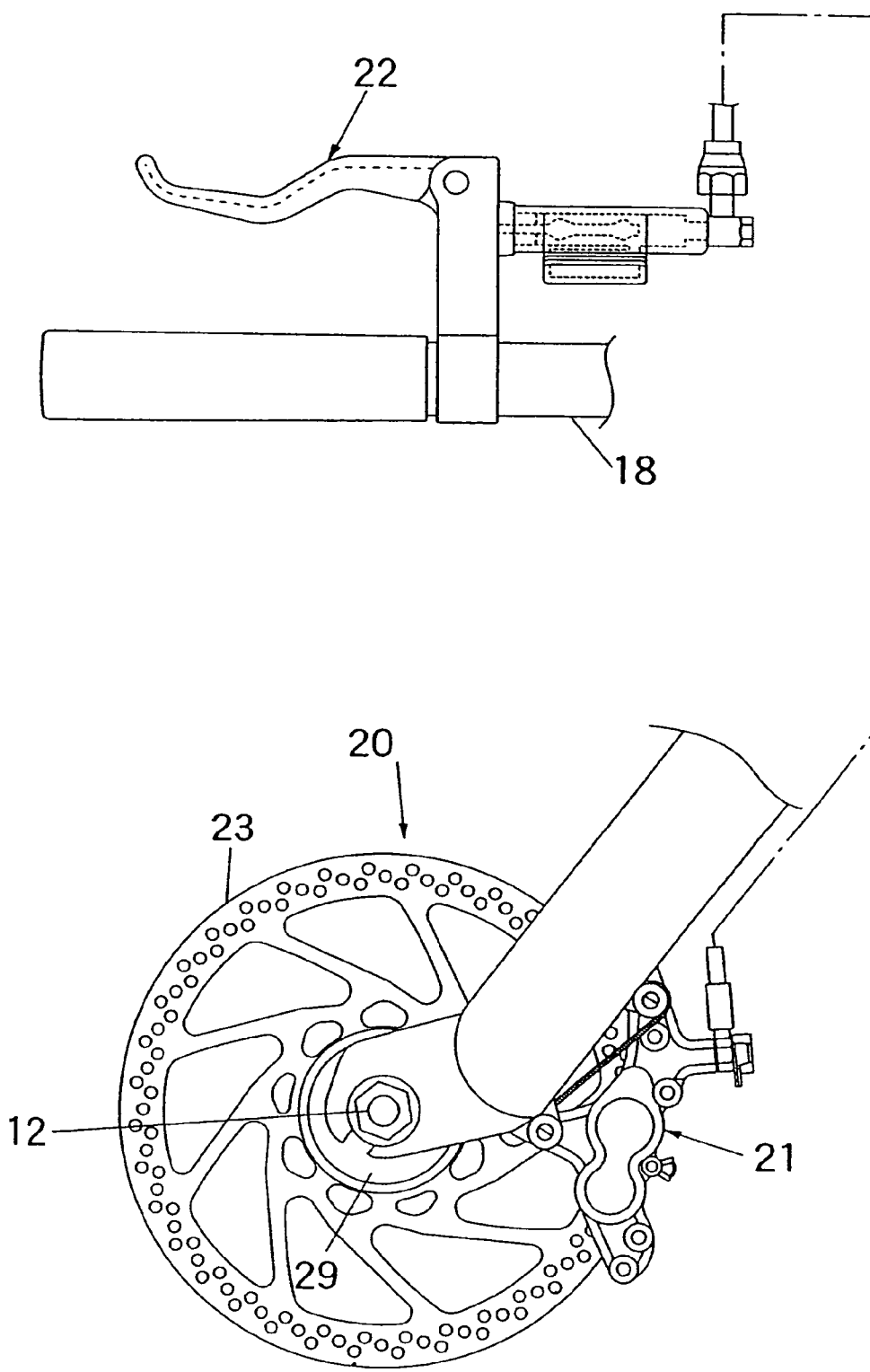
FIG. 2 is a simplified elevational view of the front disc brake apparatus mounted to the suspension fork and connected to the front disc brake operation mechanism of the bicycle shown in FIG. 1.
Figure 3:
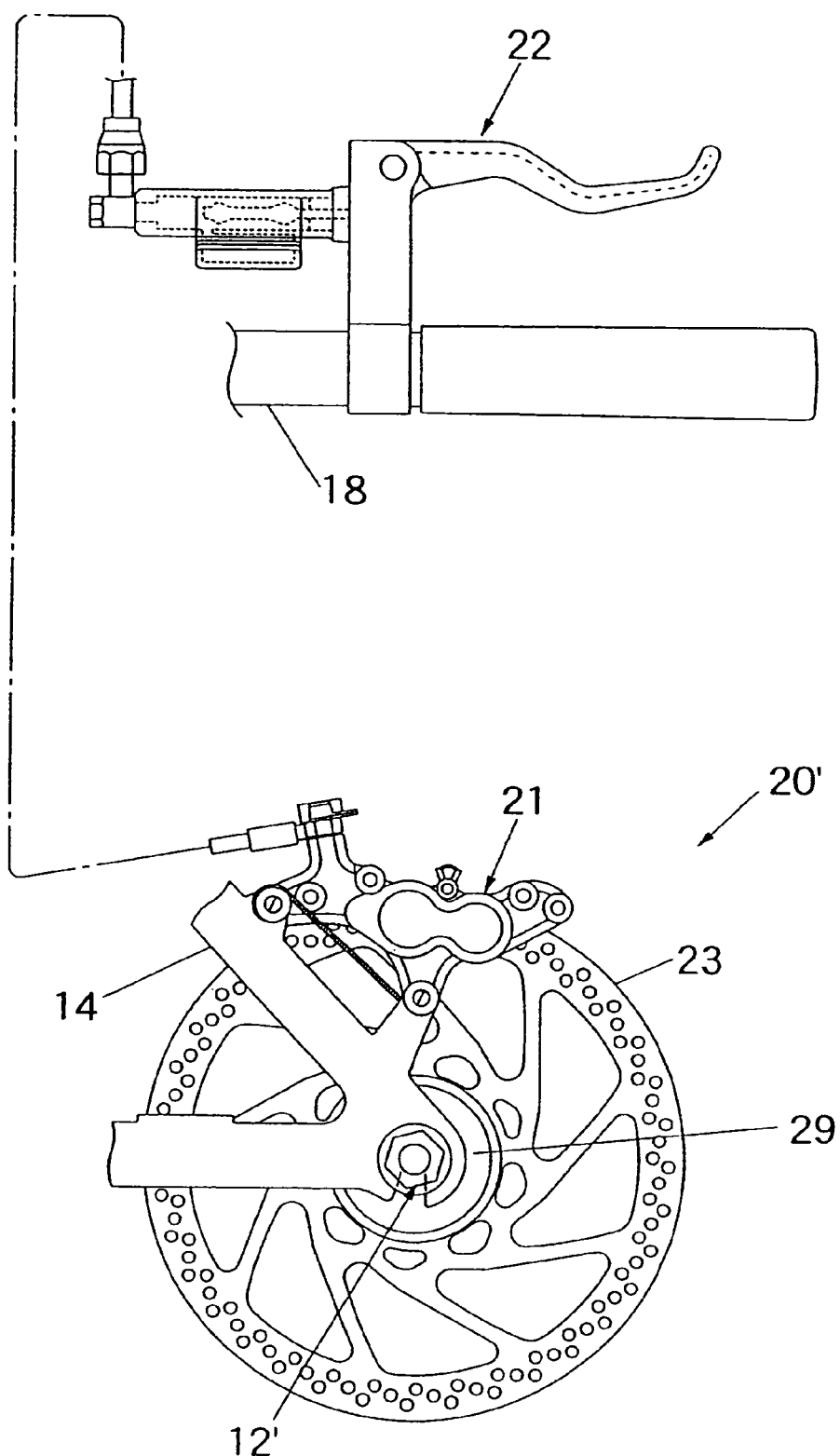
FIG. 3 is a simplified elevational view of the rear disc brake apparatus mounted to the swing arm and connected to the rear disc brake operation mechanism of the bicycle shown in FIG. 1.

The bicycle 10 further includes front and rear disc brake apparatuses 20 and 20', as shown in FIGS. 2 and 3. The front disc brake apparatus 20 and the rear disc brake apparatus 20' have essentially the same construction. In other words, many identical components are used in the front disc brake apparatus 20 and the rear disc brake apparatus 20'. Each apparatus includes a caliper 21 connected to a brake lever 22 and a disc brake rotor assembly 23. In the case of the front disc brake apparatus 20, the disc brake rotor assembly 23 is non-rotatably mounted to the front hub 12. Similarly, in the case of the rear disc brake 20', the disc brake rotor assembly 23 is non-rotatably mounted to the rear hub 12' of the rear wheel 13'.

The disk brake rotor assemblies 23 are non-rotatably and detachably mounted to the front and rear disk brake hubs 12 and 12', respectively. In the description below, the front hub 12 and the disk brake rotor assembly 23 mounted thereto will be described.

In view of the similarities between the front and rear disc brake rotor assembly 23, only the front disc brake rotor assembly 23 will be discussed in detail below. It will be apparent to those skilled in the art from this disclosure that the description of the front disc brake rotor assembly 23 applies to the construction and operation of the rear disc brake rotor assembly 23, unless otherwise states.

Figure 4:
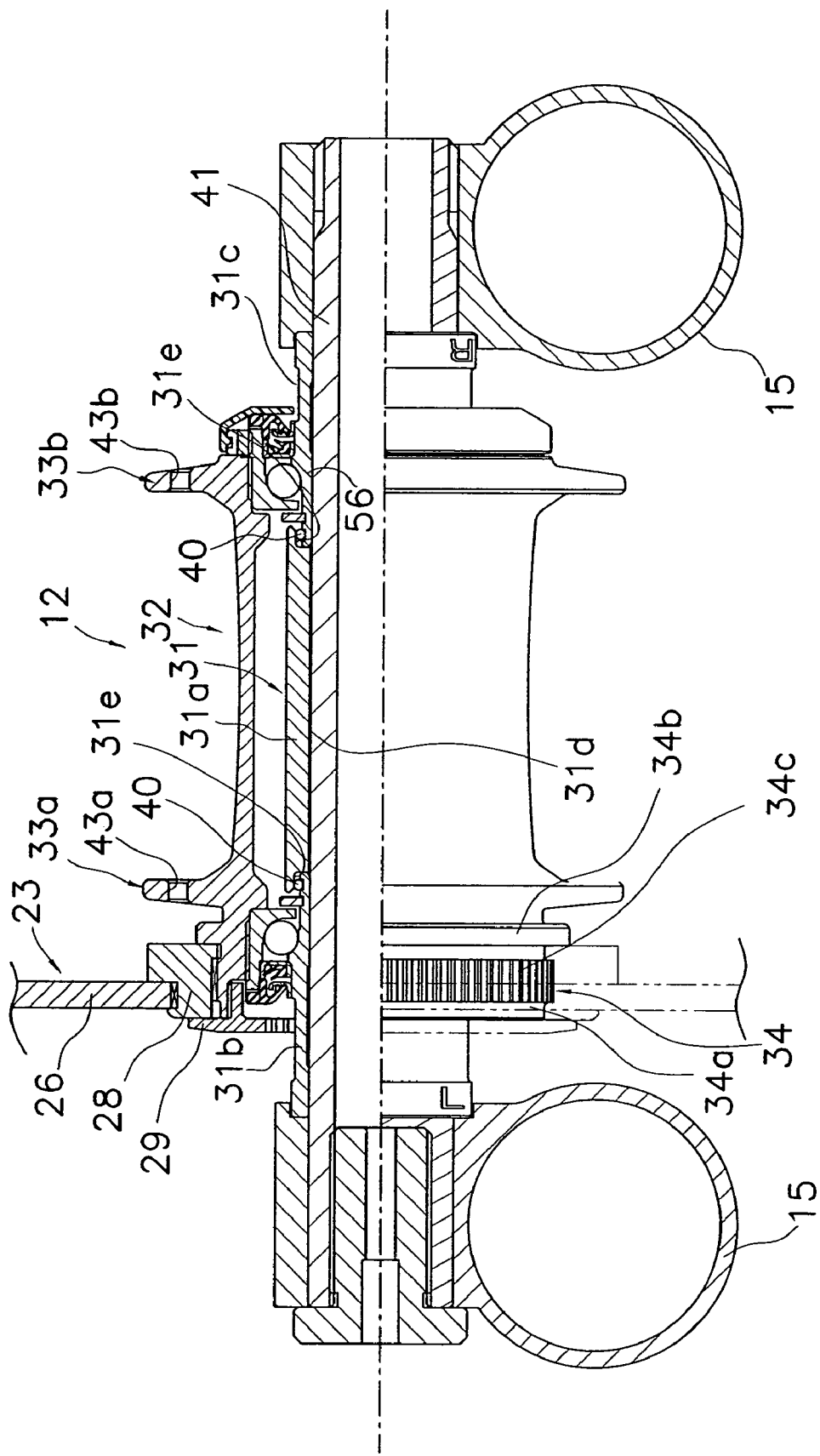
FIG. 4 is a transverse cross-sectional view of the upper half of a front hub to which a disc brake rotor assembly is mounted in accordance with one embodiment of the invention.

The front hub 12 is basically identical to the rear hub 12', except for that it does not include a freewheel. The front hub 12 includes a hub shaft 31, a hub shell 32, a first spoke connector 33a, a second spoke connector 33b and a brake rotor mounting unit 34, as shown in FIG. 4.

The hub shaft 31 rotatably supports the hub shell 32. The hub shaft 31 has a cylindrical central shaft member 31a disposed in the center and first and second shaft members 31b and 31c that contact the central shaft member 31a at either end thereof. These three components are cylindrical members having a center hole 31d through which a mounting bolt 41 passes in order to mount the front hub 12 to the suspension fork 15. The central shaft member 31a is disposed in the center of the hub shaft 31. The central shaft member 31a includes annular indentations 31e formed at each end. First and second O-rings 40 are mounted in the annular indentations 31c to prevent vibration. The central shaft member 31a is disposed so as to provide guidance during insertion of the mounting bolt 41.

The hub shell 32 includes an internal pathway that extends between the first hub shell end 32a and the second hub shell end 32b, such that the hub shaft 31 is rotatably supported inside the internal pathway. The hub shell 32 further includes first and second spoke connectors 33a and 33b. The brake rotor mounting unit 34 and first and second spoke connectors 33a and 33b are integrally formed with the hub shell 32. Specifically, the first spoke connector 33a and the brake rotor mounting unit 34 are integrally formed on the first hub shell end 32a, and the second spoke connector 33b is integrally formed on the second hub shell end 32b.

The first spoke connector 33a is an annular spoke flange disposed on the first hub shell end 32a of the hub shell 32. The first spoke connector 33a includes multiple first spoke holes 43a. The first spoke holes 43a of this embodiment are arranged along the circumferential direction at equal intervals, for example, and are disposed such that they receive the bent ends of the spokes 24 (see FIG. 1). Similarly, the second hub shell end 32b of the hub shell 32 includes multiple second spoke holes 43b that receive the bent ends of the spokes 24. The second spoke holes 43b of this embodiment are disposed along the circumferential direction at equal intervals. Each spoke hole 43b is disposed such that it can receive a bent end of a spoke 24. Therefore, the front hub 12 is designed such that the spokes 24 extend toward the outer circumference of the front wheel 13.

Figure 5:
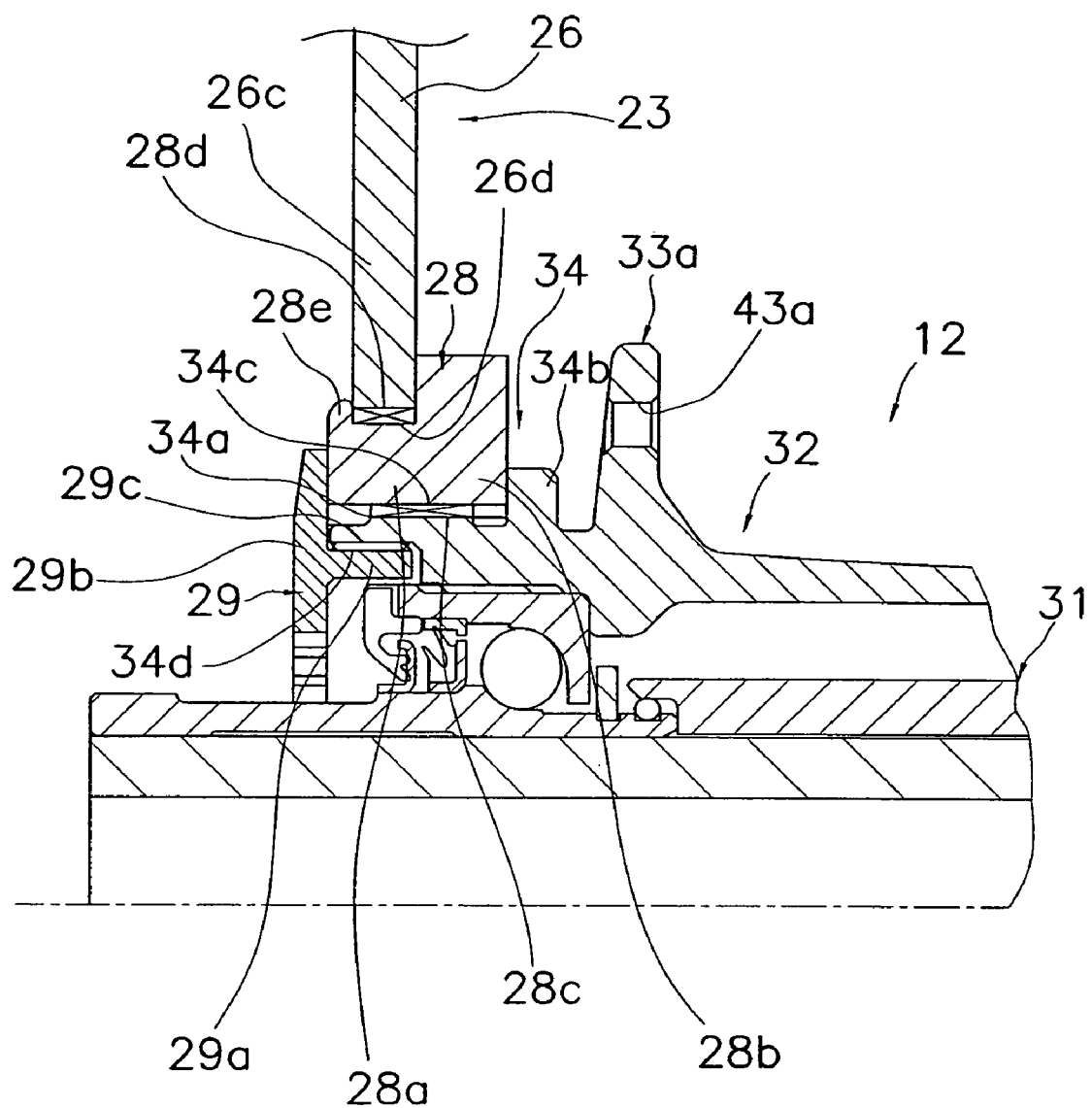
FIG. 5 is an enlarged partial cross-sectional view of the disc brake rotor assembly of FIG. 4 in accordance with the first embodiment of the present invention.
Figure 6:
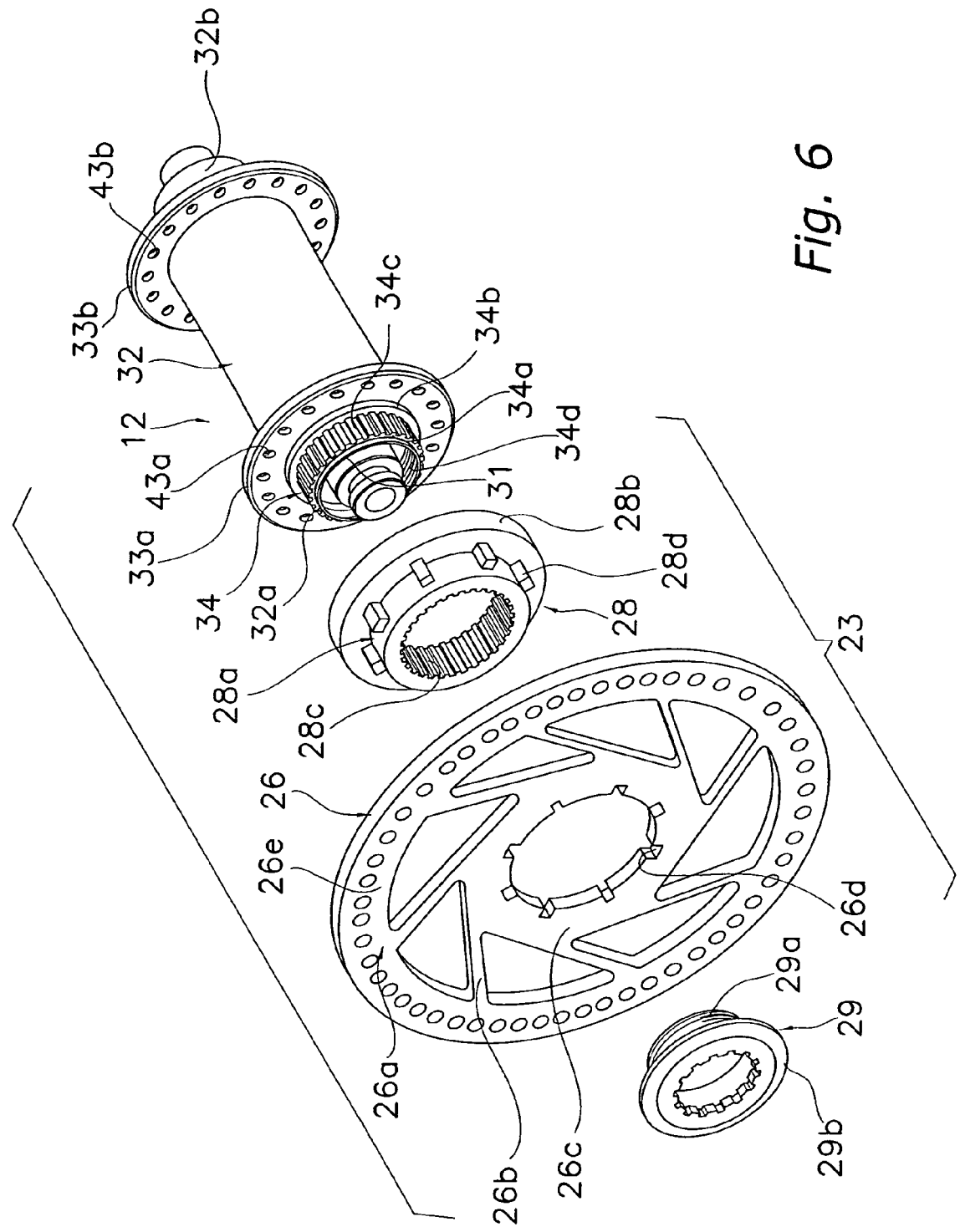
FIG. 6 is an exploded perspective view showing the construction of the disc brake rotor assembly and front hub in accordance with the first embodiment of the present invention.

Referring to FIGS. 5 and 6, the disc brake rotor assembly 23 includes an annular rotor 26, an adapter 28 to which the rotor 26 is secured, and a tightening member 29 that non-rotatably secures the adapter 28 to the front hub 12. In FIG. 6, the rotor 26 and the adapter 28 are separated for ease of explanation, but in practice the rotor 26 is secured to the adapter 28 via a securing mechanism.

The brake rotor mounting unit 34 is integrally formed with the first hub shell end 32a of the hub shell 32, as shown in FIGS. 4 through 6. The brake rotor mounting unit 34 is disposed adjacent to the first spoke connector 33a such that it faces the first hub shell end 32a. The brake rotor mounting unit 34 is a cylindrical unit that includes a cylindrical member 34a and an annular contact flange 34b that extends outward from the cylindrical member 34a.

The annular contact flange 34b is disposed at a distance from the free end of the cylindrical member 34a. The cylindrical member 34a has an outer circumferential surface that includes outer circumferential splines 34c and an annular inner circumferential surface on which is formed an internal thread 34d. The outer circumferential splines 34c comprise protruding teeth disposed along the circumferential direction and engage non-rotatably with the disc brake rotor assembly 23.

The tightening member 29 has an external thread 29e that engages the internal thread 34d. As a result, the tightening member 29 exerts pressure on the disc brake rotor assembly 23 in the direction of the annular contact flange 34b, and the disc brake rotor assembly 23 is non-rotatably secured to the brake rotor mounting unit 34 between the tightening member 29 and the annular contact flange 34b.

The annular rotor 26 is non-rotatably mounted to the front hub 12 via the adapter 28. The adapter 28 links the rotor 26 and the front hub 12 such that they cannot rotate relative to each other. The tightening member 29 screws into the internal thread 34d formed in one end of the front hub 12, thereby securing to the front hub 12 the adapter 28 to which the rotor 26 is secured.

Referring to FIG. 6, the rotor 26 includes an annular brake ring 26a having braking surfaces 26e that are gripped by the caliper 21, multiple arms 26b that are integrally formed with the annular brake ring 26a, and an inner mounting area 26c that is integrally formed with the arms 26b. The rotor 26 is preferably an integrally-formed member obtained via press-forming of a metal plate.

Multiple holes are formed in the annular brake ring 26a. The annular brake ring 26a comprises the outer braking area of the rotor 26. The outer ends of the arms 26b are disposed in an equidistant fashion within the inner circumferential area of the annular brake ring 26a.

The arms 26b comprise the central connecting area for the rotor 26, and extend between the annular brake ring 26a and the inner mounting area 26c. The arms 26b extend in a tangential fashion from the inner mounting area 26c such that triangular openings are formed between the adjacent arms 26b.

The inner mounting area 26c has an annular configuration and has multiple inner circumferential splines 26d that have multiple notch-like indentations disposed at equal intervals on the inner circumferential surface of the inner mounting area 26c along the circumferential direction.

The adapter 28 is a round cylindrical member that includes a cylindrical part 28a that is mounted to the brake rotor mounting unit 34 and a guard 28b that extends radially outward from one end of the cylindrical part 28a, as shown in FIGS. 5 and 6. The adapter 28 further includes a force transmission mechanism such as multiple inner circumferential splines 28c or multiple outer circumferential splines 28d. Inner circumferential splines 28c are formed on the inner circumferential surface of the cylindrical part 28a and engage with the outer circumferential splines 34c. As a result, the adapter 28 and the brake rotor mounting unit 34 of the front hub 12 are prohibited from rotating relative to each other. Furthermore, another rotation prevention mechanism, such as the outer circumferential splines 28d are formed on the outer circumferential surface of the cylindrical part 28a and engage with the inner circumferential splines 26d of the rotor 26.

Referring to FIG. 5, after the rotor 26 is mounted, the edge surface of the cylindrical part 28a of the adapter 28 is deformed in the outer circumferential direction via pressure exerted using a suitable jig to form a securing mechanism. For example, the securing mechanism secures the rotor 26 is secured via crimping using a deformed area 28e.

It is preferred that the adapter 28 be made of aluminum or other suitable material. On the other hand, it is preferred that the rotor 26 be made of stainless steel or other suitable material having a higher relative density than the first material used for the adapter 28.

Referring to FIGS. 5 and 6, the tightening member 29 is a cylindrical member having a cylindrical part 29a, a guard 29b and external threads 29c. The cylindrical part 29a engages with the internal thread 34d formed in the inner circumferential surface of the cylindrical member 34a. The guard 29b extends radially outward from one end of the cylindrical part 29a. The external threads 29c engage with the internal threads 34d and are formed on the outer circumferential surface of the cylindrical part 29a. The guard 29b contacts the end surface of the cylindrical part 28a of the adapter 28 when the tightening member 29 is fully threaded into the internal thread 34d, thereby applying pressure on the adapter 28 in the direction of the annular contact flange 34b. As a result, the rotor 26 and the adapter 28 are non-rotatably secured to the brake rotor mounting unit 34.

Prior to mounting, the rotor 26 is secured to the adapter 28 via crimping. The adapter 28 is mounted to the rotor 26 by aligning the protrusions and indentations of the splines 28d and 26d. Pressure is then applied to the end surface of the cylindrical part 28a of the adapter 28 using a suitable crimping jig. A deformed area 28e that protrudes radially outward is then formed such that it contacts the inner mounting area 26c of the rotor 26. Securing the rotor 26 to the adapter 28 via crimping in this fashion enables the disk brake rotor assembly 23 to be easily attached or detached.

The adapter 28, to which the rotor 26 is secured via crimping, is mounted to the brake rotor mounting unit 34 by aligning the splines 28c and 34c. The tightening member 29 is then mounted such that the adapter 28 sits between the annular contact flange 34b and the tightening member 29. The mounting of the tightening member 29 is carried out by screwing the external thread 29e of the tightening member 29 into the internal thread 34d formed in the brake rotor mounting unit 34 disposed at one end of the front hub 12. In this way, the disc brake rotor assembly 23 is non-rotatably secured to the brake rotor mounting unit 34a between the annular contact flange 34b and the tightening member 29.

Because the rotor 26 is secured to the adapter via the deformation 28e formed through crimping and is prevented from rotating by the outer circumferential splines 28d and the inner circumferential splines 26d, the rotor 26 can be easily secured to the adapter 28 using the simple securing mechanism of deforming the adapter 28. Furthermore, the rotor 26 and the adapter 28 can be made of different materials, enabling the adapter 28 to be made lightweight. Furthermore, because the adapter 28 and the rotor 26 do not come apart when the adapter is detached from the front hub 12, the rotor 26 is less prone to deformation. In addition, because the disc brake rotor assembly 23 can be attached to or detached from the front hub 12 simply by attaching or detaching the adapter 28, the disc brake rotor assembly 23 can be attached or detached easily.

Second Embodiment

Figure 7:
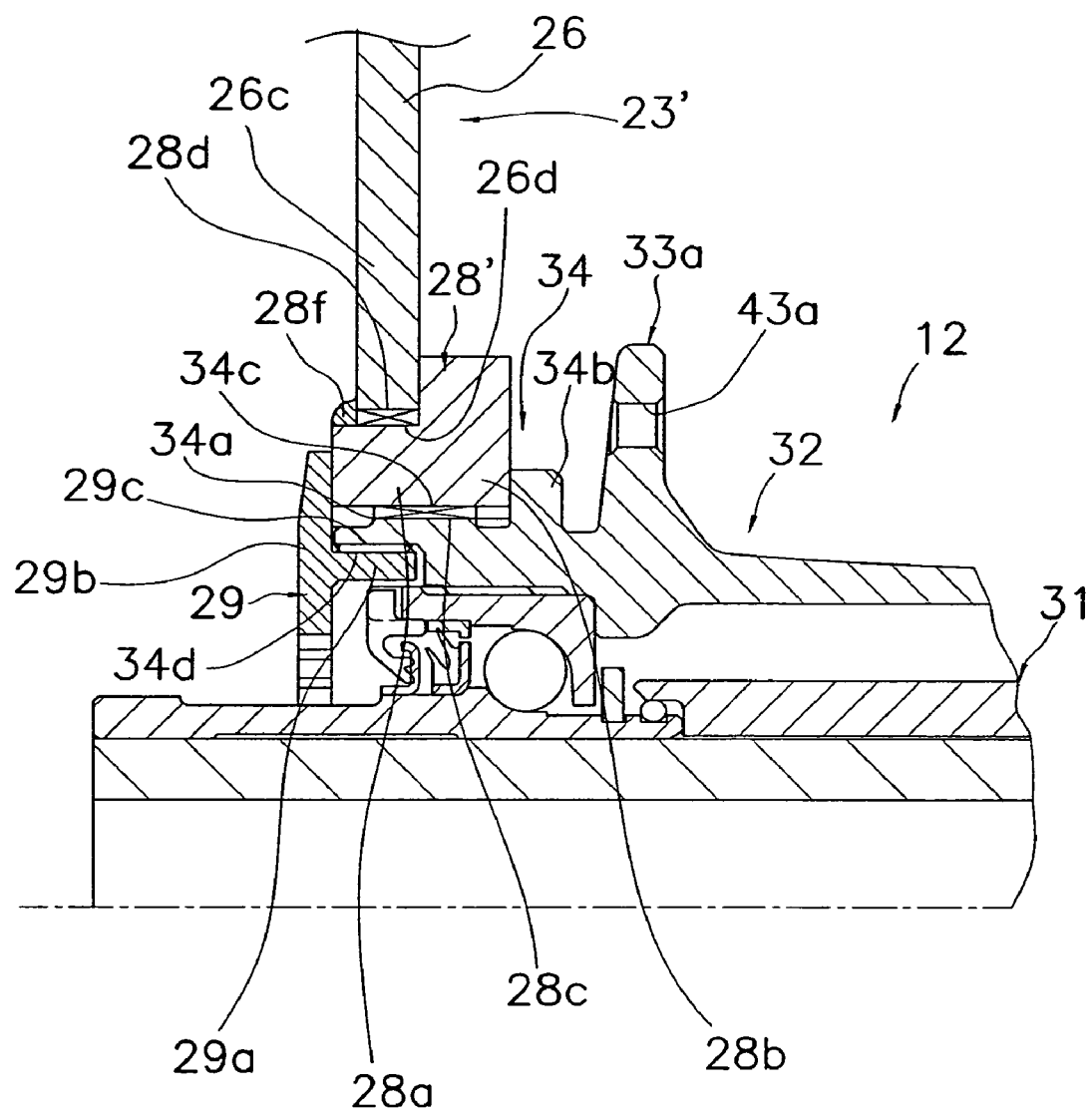
FIG. 7 is an enlarged partial transverse cross-sectional view of the disc brake rotor assembly in accordance with a second embodiment of the present invention.

Referring now to FIG. 7, a disc brake rotor assembly 23' in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In FIG. 7, the disc brake rotor assembly 23' differs from the assembly of the first embodiment in regard to the securing mechanism used for the rotor 26. That is, the adapter 28' is not deformed from crimping. Rather, in the second embodiment, the rotor 26 is secured to the adapter 28' via welding. Thus, the adapter 28' is identical to the adapter 28, except that the adapter 28' has been welded to the rotor 26 instead of being deformed to form the deformed area 28e. The adapter 28' is intended for welding and replaces the adapter 28 of the first embodiment that is intended for crimping. The rotor 26 and the adapter 28' are connected via welding beads 28f. Accordingly, the welding beads 28f form the securing mechanism in the second embodiment of the present invention. All other components of the disc brake rotor assembly 23' are identical to the disc brake rotor assembly 23 of the first embodiment.

In the disc brake rotor assembly 23' having the above construction, because the rotor 26 is secured to the adapter via welding and is prevented from rotating by the splines 28d and a rotation prevention mechanism 26d. The rotor 26 can be secured to the adapter 28' by the simple securing mechanism of welding. Furthermore, the rotor 26 and the adapter 28' can be made of different materials, such that the adapter 28' can be made lightweight. Moreover, because the adapter 28' and the rotor 26 do not come apart when the adapter is detached from the front hub 12, the rotor 26 is less prone to deformation. In addition, because the disc brake rotor assembly 23' can be attached to or detached from the front hub 12 simply by attaching or detaching the adapter 28', the disc brake rotor assembly 23' can be attached or detached easily.

Third Embodiment

Figure 8:
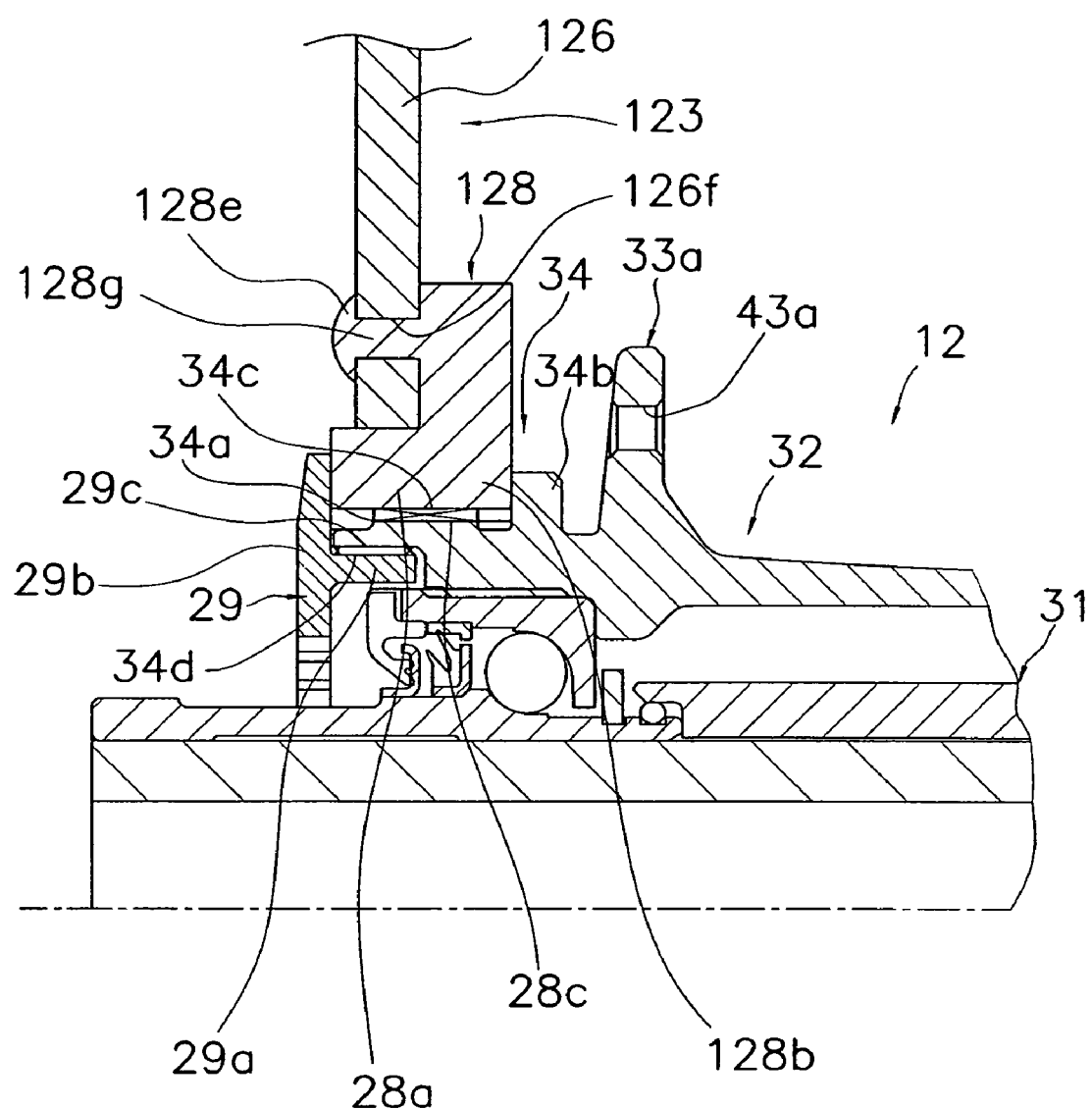
FIG. 8 is an enlarged partial transverse cross-sectional view of the disc brake rotor assembly in accordance with a third embodiment of the present invention.

Referring now to FIG. 8, a disc brake rotor assembly 123 in accordance with a third embodiment will now be explained. In view of the similarity between the third embodiment and the prior embodiments, the parts of the third embodiment that are identical to the parts of the prior embodiments will be given the same reference numerals as the parts of the prior embodiments. Moreover, the descriptions of the parts of the third embodiment that are identical to the parts of the prior embodiments may be omitted for the sake of brevity. In FIG. 8, the securing mechanism for a rotor 126 of a disc brake rotor assembly 123 of a third embodiment is different from the securing mechanism used in the above embodiments.

In the third embodiment, the adapter 128 is identical to the adapter 28, except that the splines 28d have been replaced with a plurality (eight) of bosses 128g and the adapter 128 has not be deformed to form the deformed area 28e. In the third embodiment, the (eight) bosses 128g are disposed on the outer surface of the guard 128b. The bosses 128g are round pillar-shaped protrusions disposed at equal spaced apart intervals along a circumferential direction of the adapter 128, while being parallel to the axis of rotation of the front hub 12. The bosses 128g are long enough to enable them to pass through the rotor 126.

In the third embodiment, the rotor 126 is identical to the rotor 26, except that the notches 26d have been substituted with a plurality (eight) of through-holes 126f. The through-holes 126f are formed in the rotor 126 at equally spaced apart intervals along the circumferential direction so that the (eight) bosses 128g can pass therethrough. The tip of each boss 128g is deformed using a crimping tool so as to form a deformation 128e that widens around the periphery of the through-hole 126 so as to resemble the head of a round-head bolt.

Basically, the rotor 126 and the adapter 128 of the disc brake assembly 123 are meant to replace the rotor 26 and the adapter 28 or 28' of the first and second embodiments. It will be apparent to one of skill in the art that the securing mechanisms of the first and second embodiments can be used in conjunction with the securing mechanism of the third embodiment.

Using this disc brake rotor assembly 123, the rotor 126 is secured to the adapter 128 and prevented from rotating relative thereto by the (eight) bosses 128g disposed along the circumferential direction. Therefore, a rotation prevention mechanism, such as splines, need not be formed on the inner circumferential surface of the rotor 126 and the outer circumferential surface of the adapter 128. Furthermore, because the rotor 126 is secured to the adapter 128 and is prevented from rotating by the (eight) bosses 128g, the rotor 126 can be secured to the adapter 128 using a simple securing method such as crimping. As a result, the same effects as those obtained in the previous embodiments can be obtained.

Fourth Embodiment

Figure 9:
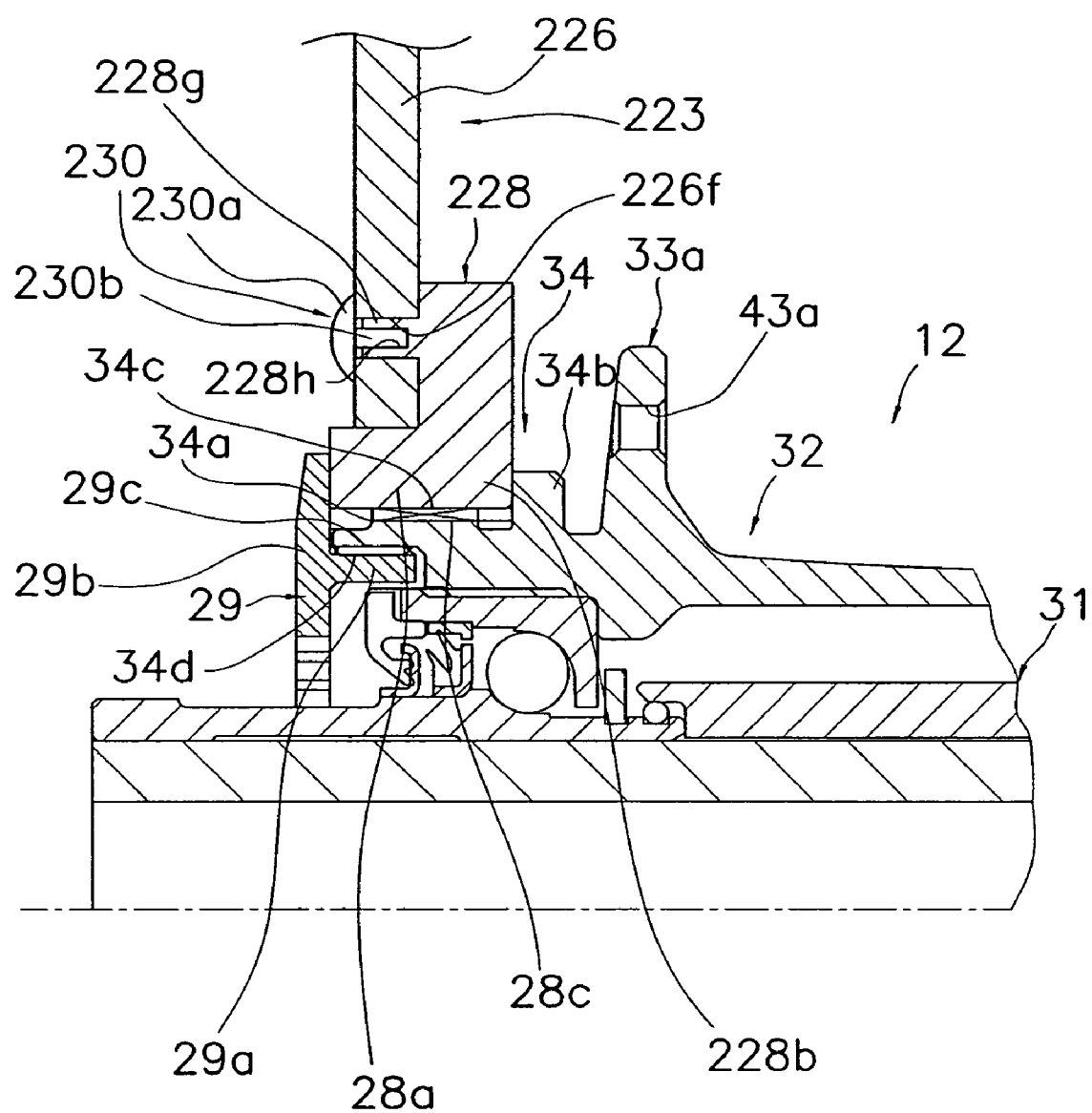
FIG. 9 is an enlarged partial transverse cross-sectional view of the disc brake rotor assembly in accordance with a fourth embodiment of the present invention.

Referring now to FIG. 9, a disc brake rotor assembly 223 in accordance with a fourth embodiment will now be explained. In view of the similarity between the fourth embodiment and the prior embodiments, the parts of the fourth embodiment that are identical to the parts of the prior embodiments will be given the same reference numerals as the parts of the prior embodiments. Moreover, the descriptions of the parts of the fourth embodiment that are identical to the parts of the prior embodiments may be omitted for the sake of brevity.

In FIG. 9, the disc brake rotor assembly 223 of the fourth embodiment differs from the third embodiment in regard to the securing mechanism for the rotor 226. The rotor 226 is secured to the adapter 228 by a plurality of rivets 230 that serve as securing members. Thus, the adapter 228 is identical to the adapter 28, except that the splines 28d have been replaced with a plurality (eight) of bosses 228g and the adapter 228 has not be deformed to form the deformed area 28e. In the fourth embodiment, the (eight) bosses 228g are disposed on the outer surface of the guard 228b. The bosses 228g are round pillar-shaped members disposed at equally spaced apart intervals along the circumferential direction and parallel to the rotational axis of the front hub 12. The bosses 228g and are shorter than the thickness of the rotor 226.

In the fourth embodiment, the rotor 226 is identical to the rotor 26, except that the notches 26d have been substituted with a plurality (eight) of through-holes 226f. The through-holes 226f are formed in the rotor 226 at equally spaced apart intervals along the circumferential direction so that the (eight) bosses 228g can pass therethrough.

A crimping hole 228h is formed in the tip of each boss 228g. A rivet or rivet 230 having a round head 230a and a shaft 230b that extends from the center of the head 230a is pressed into each crimping hole 228h. The diameter of the shaft 230b of the rivet 230 is larger than the inner diameter of the crimping hole 228h, such that when the rivet 230 is pressed into the crimping hole 228h, the boss 228g widens and presses tightly against the walls of the through-hole 226f, thereby securing the rotor 226 to the adapter 228.

Basically, the adapter 228 and the rotor 226 of the disc brake assembly 223 are meant to replace the adapter 128 and the rotor 126 of the third embodiment. The rivets 230 are used in place of the deformations 128e. Furthermore, it will be apparent to one of skill in the art that the securing mechanisms of the first and second embodiments can be used in conjunction with the securing mechanism of the fourth embodiment.

In the fourth embodiment, because the rotor 226 is secured to the adapter 228 by the rivets 230, the rotor 226 can be reliably secured to the adapter 228 and a securing mechanism and rotation prevention mechanism can be obtained by the bosses 228g.

Fifth Embodiment

Figure 10:
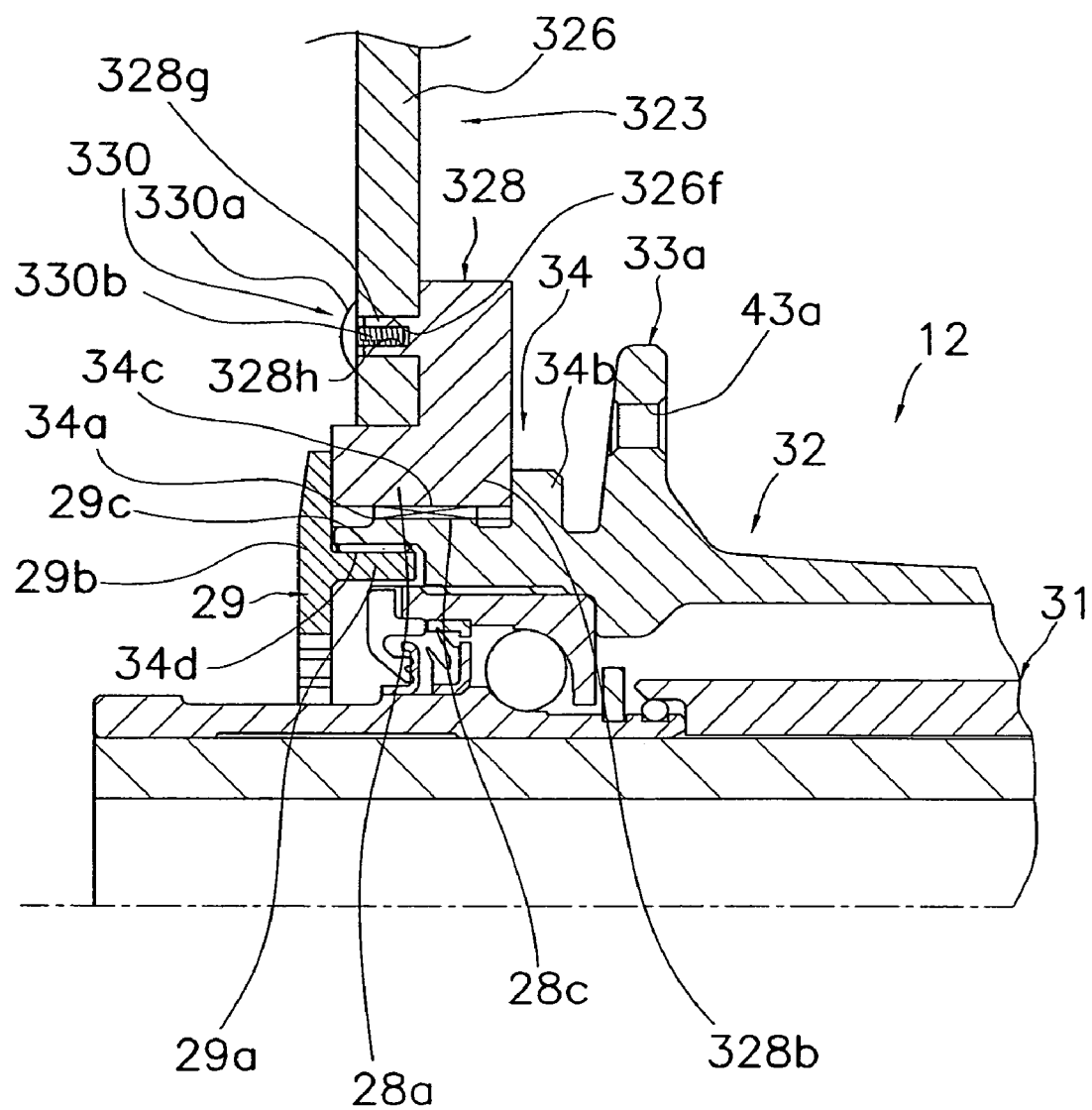
FIG. 10 is an enlarged partial transverse cross-sectional view of the disc brake rotor assembly in accordance with a fifth embodiment of the present invention.

Referring now to FIG. 10, a disc brake rotor assembly 323 in accordance with a fifth embodiment will now be explained. In view of the similarity between the fifth embodiment and the prior embodiments, the parts of the fifth embodiment that are identical to the parts of the prior embodiments will be given the same reference numerals as the parts of the prior embodiments. Moreover, the descriptions of the parts of the fifth embodiment that are identical to the parts of the prior embodiments may be omitted for the sake of brevity.

In FIG. 10, the disc brake rotor assembly 323 of the fifth embodiment differs from the fourth embodiment in regard to the securing mechanism for the rotor 326, and the rotor 326 is secured to the adapter 328 by securing bolts 330 that serve as securing members. In the fifth embodiment, the adapter 328 is identical to the adapter 28, except that the splines 28d have been replaced with a plurality (eight) of bosses 328g and the adapter 328 has not be deformed to form the deformed area 28e. In the fifth embodiment, the (eight) bosses 328g are disposed on the outer surface of the guard 228b. The bosses 328g are round pillar-shaped members disposed at equal intervals along the circumferential direction and parallel to the rotational axis of the front hub 12. The bosses 328g are shorter than the thickness of the rotor 326.

In the fifth embodiment, the rotor 326 is identical to the rotor 26, except that the notches 26d have been substituted with a plurality (eight) of through-holes 326f. The through-holes 326f are formed in the rotor 326 at equally spaced apart intervals along the circumferential direction so that the (eight) bosses 328g can pass therethrough.

A screw hole 328h is formed in the tip of each boss 328g. A fixing bolt 330 having a round head 330a and a shaft 330b that extends from the center of the head 330a is screwed into the screw hole 328h. When the securing bolt 330 is screwed into the screw hole 328h, the head 330a exerts pressure on the rotor 236 toward the guard 328b, thereby securing the rotor 326 to the adapter 328.

Basically, the adapter 328 and the rotor 326 of the disc brake assembly 323 are meant to replace the adapter 228 and the rotor 226 of the fourth embodiment. The fixing or securing bolts 330 are used in place of the rivets 230. Furthermore, it will be apparent to one of skill in the art that the securing mechanisms of the first and second embodiments can be used in conjunction with the securing mechanism of the fifth embodiment.

In the fifth embodiment, because the rotor 326 is secured to the adapter 328 by the securing bolts 330, the rotor 326 can be reliably secured to the adapter 328 and a securing mechanism and rotation prevention mechanism can be obtained by the bosses 328g.

Sixth Embodiment

Figure 11:
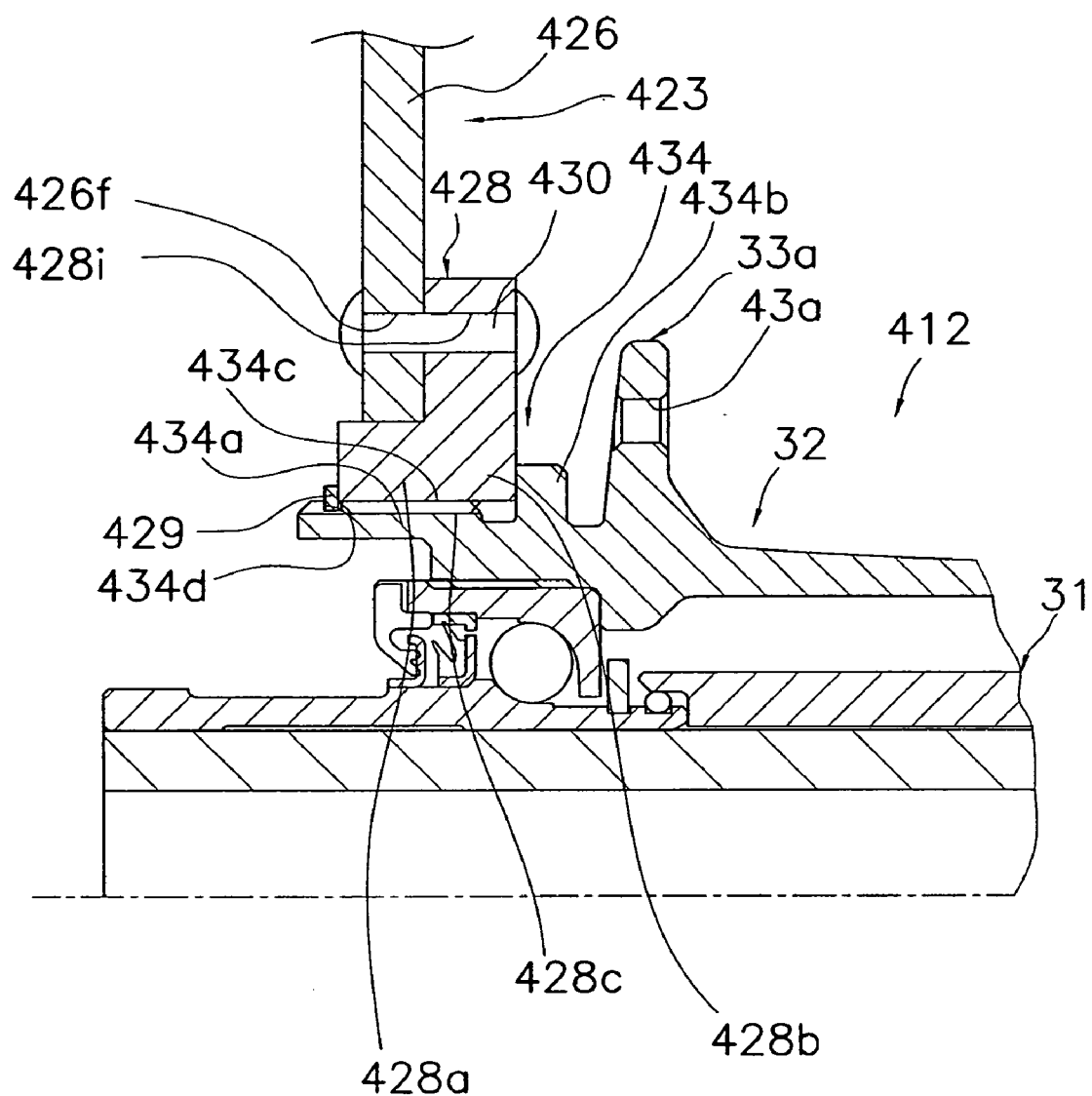
FIG. 11 is an enlarged partial transverse cross-sectional view of the disc brake rotor assembly in accordance with a sixth embodiment of the present invention.

Referring now to FIG. 11, a disc brake rotor assembly 423 in accordance with a sixth embodiment will now be explained. In view of the similarity between the sixth embodiment and the prior embodiments, the parts of the sixth embodiment that are identical to the parts of the prior embodiments will be given the same reference numerals as the parts of the prior embodiments. Moreover, the descriptions of the parts of the sixth embodiment that are identical to the parts of the prior embodiments may be omitted for the sake of brevity.

In FIG. 11, the disc brake rotor assembly 423 of the sixth embodiment differs from the first through fifth embodiments described above in regard to the force transmission mechanism of the adapter 428. Force is transmitted from the adapter 428 to the front hub 412 via an internal thread 428c formed on the inner circumferential surface of the cylindrical part 428a of the adapter 428. In the sixth embodiment, the adapter 428 is identical to the adapter 28, except that the inner splines 28c have been replaced with internal thread 428c, the outer splines 28d have been replaced with a plurality (eight) of through-holes 428i, and the adapter 428 has not be deformed to form the deformed area 28e. In the fifth embodiment, the (eight) through-holes 428i are disposed on the outer surface of the guard 428b.

In the sixth embodiment, the cylindrical part 434a of the brake rotor mounting unit 434 of the front hub 412 has an outer circumferential surface that includes an external thread 434c and an annular groove 434d formed in the external thread 434c. As a result, the cylindrical part 434a is longer than the corresponding part in the above embodiments by the width of the annular groove 434d. The external thread 434c engages with the internal thread 428c of the adapter 428 of the disc brake rotor assembly 423. An elastic stopper ring 429 that prevents the adapter 428 from becoming loose is mounted in the annular groove 434d. The annular groove 434d is formed such that the elastic stopper ring 429 comes into contact with the adapter 428 and is mounted at a distance from the contact surface of the annular contact flange 434b substantially equal to the thickness of the adapter 428.

The sixth embodiment further differs from the first through fifth embodiments in regard to the securing mechanism. In the sixth embodiment, the rotor 426 is identical to the rotor 26, except that the notches 26d have been substituted with a plurality (eight) of through-holes 426f. The through-holes 426f are formed in the rotor 426 at equally spaced apart intervals along the circumferential direction so that (eight) rivets 430 can pass therethrough.

The adapter 428 has the through-holes 428i disposed at equal intervals along the circumferential direction and parallel to the rotational axis of the front hub 412. Furthermore, the through-holes 426f and the through-holes 428i are configured and arranged to align with each other. One of the rivets 430 passes through each corresponding pair of holes 428i and 426f. Either end of the rivets 430 are deformed by having its diameter widened using a crimping tool such that it resembles the head of a round-head bolt.

Basically, the adapter 428 and the rotor 426 of the disc brake assembly 423 are meant to replace the adapter 328 and the rotor 326 of the fifth embodiment. The rivets 430 are used in place of the fixing or securing bolts 330. In addition, the transmission mechanism of the sixth embodiment is meant to replace the transmission mechanism of the first through fifth embodiments. The tightening member 29 and the brake rotor mounting unit 34 of the first through fifth embodiments are replaced with the elastic stopper ring 429 and the brake rotor mounting unit 434 of the sixth embodiment.

In the sixth embodiment, the rivets 430 were used as both the securing mechanism and the rotation prevention mechanism for the rotor 426 and the adapter 428. However, the construction for the securing mechanism and rotation mechanism used in the first through fifth embodiments can be used as well with this sixth embodiment.

In the sixth embodiment, because force is transmitted from the adapter 428 to the front hub 412 via mating threads, the force transmission mechanism has a simple construction. Because the mechanism to prevent loosening is achieved using the elastic stopper ring 429, the mechanism to prevent loosening is simpler as well.

Seventh Embodiment

Figure 12:
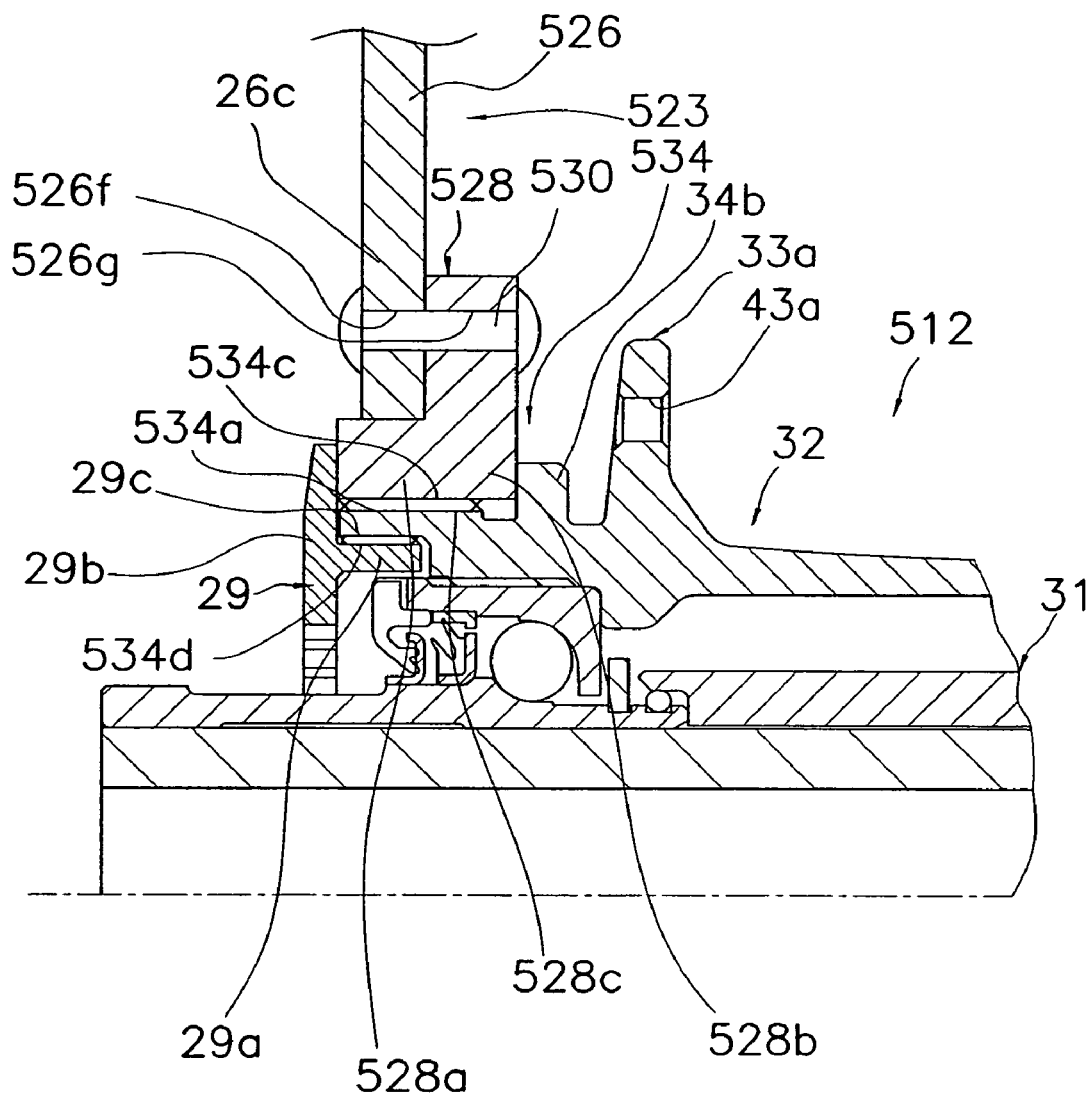
FIG. 12 is an enlarged partial transverse cross-sectional view of the disc brake rotor assembly in accordance with a seventh embodiment of the present invention.

Referring now to FIG. 12, a disc brake rotor assembly 523 in accordance with a seventh embodiment will now be explained. In view of the similarity between the seventh embodiment and the prior embodiments, the parts of the seventh embodiment that are identical to the parts of the prior embodiments will be given the same reference numerals as the parts of the prior embodiments. Moreover, the descriptions of the parts of the seventh embodiment that are identical to the parts of the prior embodiments may be omitted for the sake of brevity.

The disc brake rotor assembly 523 of the seventh embodiment differs from the sixth embodiment described above in regard to the mechanism to prevent the adapter 528 from loosening, in that the tightening member 29 has the same construction as that used in the first through fifth embodiments. Therefore, an annular groove for mounting of an elastic stopper ring is not formed on the outer circumferential surface of the cylindrical part 534a of the brake rotor mounting unit 534 of the front hub 5. Rather, an internal thread 534d is formed on the inner circumferential surface of the cylindrical part 534a. In other words, in the seventh embodiment, the cylindrical part 534a of the brake rotor mounting unit 534 of the front hub 512 has an outer circumferential surface that includes an external thread 534c and an inner circumferential surface that includes an internal thread 534d.

Thus, the adapter 528 is identical to the adapter 428. In other words, the adapter 528 is identical to the adapter 28, except that the inner splines 28c have been replaced with internal thread 528c, the outer splines 28d have been replaced with a plurality (eight) of through-holes 526g, and the adapter 528 has not be deformed to form the deformed area 28e. In the fifth embodiment, the (eight) through-holes 528i are disposed on the outer surface of the guard 528b.

The external thread 534c engages with the internal thread 528c of the adapter 528 of the disc brake rotor assembly 523. Force is transmitted from the adapter 528 to the front hub 512 via an internal thread 528c formed on the internal circumferential surface of the cylindrical part 528a of the adapter 528. The internal thread 534d engages with the external thread 29e of the tightening member 29. The external thread 534c is a right-handed thread while the internal thread 534d is a left-handed thread. Therefore, when normal braking is carried out, the adapter 528 rotates in the direction of tightening relative to the front hub 512. Furthermore, when braking on an uphill slope or backing up, the adapter 528 is less prone to becoming loose because the tightening member 29 rotates in the tightening direction relative to the adapter 528 even though the adapter 528 rotates in the loosening direction relative to the front hub 512.

In the fifth embodiment, the rotor 526 is identical to the rotor 26, except that the notches 26d have been substituted with a plurality (eight) of through-holes 526f. The through-holes 526f are formed in the rotor 526 at equally spaced apart intervals along the circumferential direction so that (eight) rivets 530 can pass therethrough.

Basically, the adapter 528 and the rotor 526 of the disc brake assembly 523 are meant to replace the adapter 428 and the rotor 426 of the sixth embodiment. The tightening member 29 has a construction identical to that of the corresponding member in the first though fifth embodiments. The right handed external threads 534c and the left handed internal threads 534d are used in place of the outer circumferential splines 34c and the inner circumferential splines 26c.

In the seventh embodiment, the rivets 530 were used as the securing mechanism and the rotation prevention mechanism for the rotor 526 and the adapter 528. However, the construction for the securing mechanism and rotation mechanism used in the first through fifth embodiments can be used as well with the seventh embodiment.

As used herein, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle disc brake rotor assembly comprising:
a ring-shaped rotor having a pair of braking surfaces to be gripped by a caliper;
an adapter including a securing mechanism configured to secure the rotor thereto, a rotation prevention mechanism formed between an outside surface of the adapter and the rotor to prevent rotation of the rotor relative to the adapter, and an internal force transmission mechanism configured to transmit a braking force exerted on the rotor to an outer circumferential surface of a hub, the internal force transmission mechanism includes a first internal thread configured to engage an external thread formed on the outer circumferential surface of the hub; and
a hub attaching member configured to secure the adapter to the hub separately from the securing mechanism securing the rotor to the adapter such that the hub attaching member is in a spaced apart relationship with respect to the rotor.

2. The bicycle disc brake rotor assembly according to claim 1, wherein
the hub attaching member is a stopper ring configured to be mounted in an annular groove formed in the external thread of the hub to prevent the adapter from becoming loose.

3. The bicycle disc brake rotor assembly according to claim 1, wherein
the hub attaching member is a tightening member includes a second internal thread configured to engage the bicycle hub to prevent the adapter from becoming loose.

4. The bicycle disc brake rotor assembly according to claim 3, wherein
the second internal thread runs in an opposite direction from the first internal thread.

5. The bicycle disc brake rotor assembly according to claim 1, wherein
the securing mechanism of the adapter includes rivets that couple the rotor to the adapter.

6. The bicycle disc brake rotor assembly according to claim 1, wherein
the securing mechanism of the adapter includes welding.

7. A bicycle disc brake rotor assembly comprising:
a ring-shaped rotor having a pair of braking surfaces to be gripped by a caliper;
an adapter including a securing mechanism configured to secure the rotor thereto, a rotation prevention mechanism formed between an outside surface of the adapter and the rotor to prevent rotation of the rotor relative to the adapter, and an internal force transmission mechanism configured to transmit a braking force exerted on the rotor to an outer circumferential surface of a hub, the securing mechanism of the adapter includes crimping that deforms the adapter; and
a hub attaching member configured to secure the adapter to the hub separately from the securing mechanism securing the rotor to the adapter such that the hub attaching member is in a spaced apart relationship with respect to the rotor.

8. A bicycle disc brake rotor assembly comprising:
a rotor having a pair of braking surfaces to be gripped by a caliper;
an adapter configured to be mounted to a bicycle hub, the adapter including a plurality of external bosses disposed at equal intervals in a circumferential direction of the adapter to non-rotatably secure the rotor to the adapter, and an internal force transmission mechanism configured to transmit a braking force exerted on the rotor to an outer circumferential surface of the bicycle hub, each of the bosses including a hole formed at a tip of each of the bosses with securing members secured to the holes to secure the rotor to the adapter; and
a hub attaching member configured to secure the adapter to the hub separately from the securing mechanism securing the rotor to the adapter such that the hub attaching member is in a spaced apart relationship with respect to the rotor.

9. A bicycle disc brake rotor assembly comprising:
a rotor having a pair of braking surfaces to be gripped by a caliper;
an adapter configured to be mounted to a bicycle hub, the adapter including a plurality of external bosses disposed at equal intervals in a circumferential direction of the adapter to non-rotatably secure the rotor to the adapter, and an internal force transmission mechanism configured to transmit a braking force exerted on the rotor to an outer circumferential surface of the bicycle hub, the rotor being secured to the adapter via crimping that deforms a tip of each of the bosses; and
a hub attaching member configured to secure the adapter to the hub separately from the securing mechanism securing the rotor to the adapter such that the hub attaching member is in a spaced apart relationship with respect to the rotor.

10. A bicycle disc brake rotor assembly comprising:
a rotor having a pair of braking surfaces to be gripped by a caliper;
an adapter configured to be mounted to a bicycle hub, the adapter including a plurality of external bosses disposed at equal intervals in a circumferential direction of the adapter to non-rotatably secure the rotor to the adapter, and an internal force transmission mechanism configured to transmit a braking force exerted on the rotor to an outer circumferential surface of the bicycle hub, the internal force transmission mechanism including a first internal thread configured to engage an external thread formed on the outer circumferential surface of the bicycle hub; and
a hub attaching member configured to secure the adapter to the hub separately from the securing mechanism securing the rotor to the adapter such that the hub attaching member is in a spaced apart relationship with respect to the rotor.

11. The bicycle disc brake rotor assembly according to claim 10, wherein the hub attaching member is a stopper ring configured to be mounted in an annular groove formed in the external thread of the bicycle hub to prevent the adapter from becoming loose.

12. The bicycle disc brake rotor assembly according to claim 10 wherein
the internal force transmission mechanism includes splines that non-rotatably mate with the outer circumferential surface of the bicycle hub.

13. The bicycle disc brake rotor assembly according to claim 10 wherein
the hub attaching member is a tightening member that includes a second internal thread configured to engage the bicycle hub to prevent the adapter from becoming loose.

14. The bicycle disc brake rotor assembly according to claim 13, wherein
the second internal thread runs in an opposite direction from the first internal thread.

15. A bicycle disc brake rotor assembly comprising:
a ring-shaped rotor having a pair of braking surfaces to be gripped by a caliper; and
an adapter configured to be mounted to a bicycle hub, the adapter including:
a securing mechanism configured to secure the rotor to the adapter in a spaced apart relationship relative to the bicycle hub,
a rotation prevention mechanism formed between an outside surface of the adapter and the rotor to prevent rotation of the rotor relative to the adapter,
an internal force transmission mechanism configured to transmit a braking force exerted on the rotor to an outer circumferential surface of the bicycle hub, the internal force transmission mechanism including splines that non-rotatably mate with the outer circumferential surface of the bicycle hub, and
a hub attaching member configured to secure the adapter to the hub separately from the securing mechanism securing the rotor to the adapter such that the hub attaching member is in a spaced apart relationship with respect to the rotor.

16. The bicycle disc brake rotor assembly according to claim 15, wherein
the rotation prevention includes splines formed on the adapter and rotor.

17. The bicycle disc brake rotor assembly according to claim 16, wherein
the securing mechanism of the adapter includes crimping that deforms a portion of the adapter.

18. The bicycle disc brake rotor assembly according to claim 16, wherein
the securing mechanism of the adapter includes welding.

* * * * *